(12) United States Patent
Matsuyama

(10) Patent No.: US 8,131,022 B2
(45) Date of Patent: Mar. 6, 2012

(54) SURVEILLANCE RECORDER AND ITS METHOD

(75) Inventor: Yoshiyuki Matsuyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1193 days.

(21) Appl. No.: 11/574,177

(22) PCT Filed: Aug. 5, 2005

(86) PCT No.: PCT/JP2005/014387
§ 371 (c)(1),
(2), (4) Date: Feb. 23, 2007

(87) PCT Pub. No.: WO2006/025185
PCT Pub. Date: Mar. 9, 2006

(65) Prior Publication Data
US 2007/0269082 A1    Nov. 22, 2007

(30) Foreign Application Priority Data

Aug. 31, 2004  (JP) ................................. 2004-251595

(51) Int. Cl.
*G06K 9/00* (2006.01)
*G06K 9/46* (2006.01)
*H04N 9/47* (2006.01)
(52) U.S. Cl. ......... 382/118; 382/181; 382/190; 348/143
(58) Field of Classification Search ........................ None
See application file for complete search history.

(56) References Cited

U.S. PATENT DOCUMENTS

| 5,410,609 | A | * | 4/1995 | Kado et al. ..................... 382/118 |
| 6,928,233 | B1 | * | 8/2005 | Walker et al. ................. 386/241 |
| 2002/0175997 | A1 | | 11/2002 | Takata et al. |

FOREIGN PATENT DOCUMENTS

| JP | 2003-46911 | | 2/2003 |
| JP | 2003-61075 | | 2/2003 |
| JP | 2003046911 A | * | 2/2003 |
| JP | 2003-99783 | | 4/2003 |
| JP | 2003099783 A | * | 4/2003 |
| JP | 2003-216935 | | 7/2003 |
| JP | 2003216935 A | * | 7/2003 |

* cited by examiner

*Primary Examiner* — Samir Ahmed
*Assistant Examiner* — Fred Hu
(74) *Attorney, Agent, or Firm* — Pearne & Gordon LLP

(57) ABSTRACT

A surveillance recorder (10) comprises: a picture input unit (12) for inputting a surveillance picture; a moving object detection unit (18) for detecting a moving object from a surveillance picture inputted by the picture input unit (12); a face image detection unit (20) for detecting, from an object detected by the moving object detection unit (18), a part having an elliptical outline as a face image; an identity judgment unit (22) for judging whether a face image newly detected by the face image detection unit (20) is of a same person as a face image detected last time or not based on positions of each face image; a storage image choice unit (24) for, when a newly detected face image has been judged to be of a same person by the identity judgment unit (22), choosing one face image from a face image of the same person stored in a recording medium (16) and the newly detected face image; and an image storage unit (26) for, when a newly detected face image has been chosen by the storage image choice unit (24), storing in the recording medium (16) both the newly detected face image and information for searching for the face image together. This allows an image suitable for storage to be detected from a surveillance picture.

14 Claims, 10 Drawing Sheets

SURVEILLANCE RECORDER AND ITS METHOD

TECHNICAL FIELD

The present invention relates to a surveillance recorder and its method for recording a surveillance picture obtained by taking a picture of a human motion or the like with a camera.

BACKGROUND ART

Conventionally, there have been known surveillance recorders and their methods for recording a surveillance picture taken by a surveillance camera or the like. A surveillance recorder is required to be able to detect a person's image efficiently and appropriately from a recorded surveillance picture. Japanese Published Patent Application No. 2003-46911 discloses a surveillance recorder that chooses from a surveillance picture and stores a standard person's image in order to allow a person's image to be appropriately searched for. In the device described in this patent document, when a person is to be detected, matching is performed with a standard front face template, and a face image of a shot showing the greatest similarity in the matching is chosen as an image suitable for storage. In another face image choice method, an image having the largest number of pixels that belongs to a skin color region in a color space is chosen as an image suitable for storage.

DISCLOSURE OF THE INVENTION

Problems to be Solved by the Invention

The above patent document, however, describes the method of storage by means of the front face template matching and does not describe a method of detecting a non-frontal face image. As a surveillance camera takes a picture usually from above, it is desirable that a face image can be appropriately detected also from a picture taken from other than the front.

A purpose of the invention made in the above-mentioned background is to provide a surveillance recorder and its method capable of detecting an appropriate image from a surveillance picture and storing it.

Means for Solving the Problems

A surveillance recorder of the invention comprises: a picture input unit for inputting a surveillance picture; a moving object detection unit for detecting a moving object from a surveillance picture inputted by the picture input unit; a face image detection unit for detecting, from an object detected by the moving object detection unit, a part having an elliptical outline as a face image; an identity judgment unit for judging whether a face image newly detected by the face image detection unit is of a same person as a face image detected last time or not based on positions of each face image; a storage image choice unit for choosing a face image to be stored from a plurality of face images that have been judged to be of a same person by the identity judgment unit; and an image storage unit for storing in a recording medium both a face image chosen by the storage image choice unit and information for searching for the face image together.

A surveillance recorder of another aspect of the invention comprises: a picture input unit for inputting a surveillance picture; a moving object detection unit for detecting a moving object from a surveillance picture inputted by the picture input unit; a face image detection unit for detecting, from an object detected by the moving object detection unit, a part having an elliptical outline as a face image; an identity judgment unit for judging whether a face image newly detected by the face image detection unit is of a same person as a face image detected last time or not based on positions of each face image; a storage image choice unit for, when a newly detected face image has been judged to be of a same person by the identity judgment unit, choosing one from a face image of the same person stored in a recording medium and the newly detected face image; and an image storage unit for, when a newly detected face image has been chosen by the storage image choice unit, storing in the recording medium both the newly detected face image and information for searching for the face image together.

In the above surveillance recorder, the image storage unit, when the identity judgment unit has judged that a face image newly detected by the face image detection unit is of a person different from a person whose face image was detected last time, may store in the recording medium the newly detected face image as a person who has newly appeared in a surveillance picture.

In the above surveillance recorder, the identity judgment unit, if a distance between a position where a face image has been newly detected by the face image detection unit and a position where a face image was detected last time is less than a prescribed threshold, may judge that the newly detected face image is of a same person as the face image detected last time.

In the above surveillance recorder, the identity judgment unit, when a plurality of face images have been detected by the face image detection unit, may judge that a face image newly detected in a position nearest to a face image detected last time is of a same person as the face image detected last time.

In the above surveillance recorder, the identity judgment unit, when there are a plurality of face images detected last time, may judge that a face image detected last time in a position nearest to a newly detected face image is of a same person as the newly detected face image.

In the above surveillance recorder, the identity judgment unit may detect a direction of movement of face images detected one after another by the face image detection unit and, if having detected a change in a direction of movement, may judge that a face image is of another person.

In the above surveillance recorder, the identity judgment unit, if a time taken from when a face image was detected by the face image detection unit to when a face image is newly detected has exceeded a prescribed threshold, may judge that the newly detected face image is of another person.

In the above surveillance recorder, the storage image choice unit may choose, from a face image stored in the recording medium and a face image newly detected by the face image detection unit, a face image of a larger size.

In the above surveillance recorder, the storage image choice unit may choose, from a face image stored in the recording medium and a face image newly detected by the face image detection unit, a face image whose average of distances from a center position to each pixel on an outline image of the face image is larger than the other's.

In the above surveillance recorder, the storage image choice unit may choose, from a face image stored in the recording medium and a face image newly detected by the face image detection unit, a face image whose difference in average luminance between left and right is smaller than the other's.

In the above surveillance recorder, the storage image choice unit may choose, from a face image stored in the recording medium and a face image newly detected by the face image detection unit, a face image more similar to a preset face outline template.

In the above surveillance recorder, the storage image choice unit may give scores for each of a plurality of judgment items to a face image stored in the recording medium and to a face image newly detected by the face image detection unit, and may choose a face image whose total score of the plurality of judgment items is higher than the other's.

In the above surveillance recorder, the storage image choice unit may give scores for each of a plurality of judgment items to a face image newly detected by the face image detection unit and, if a total score of the plurality of judgment items has exceeded a prescribed threshold, may choose the detected face image.

A surveillance recording method of the invention comprises: a picture input step of inputting a surveillance picture; a moving object detection step of detecting a moving object from a surveillance picture inputted in the picture input step; a face image detection step of detecting, from an object detected in the moving object detection step, a part having an elliptical outline as a face image; an identity judgment step of judging whether a face image newly detected in the face image detection step is of a same person as a face image detected last time or not based on positions of each face image; a storage image choice step of choosing a face image to be stored from a plurality of face images that have been judged to be of a same person in the identity judgment step; and an image storage step of storing in a recording medium both a face image chosen in the storage image choice step and information for searching for the face image together.

A surveillance recording method of the invention comprises: a picture input step of inputting a surveillance picture; a moving object detection step of detecting a moving object from a surveillance picture inputted in the picture input step; a face image detection step of detecting, from an object detected in the moving object detection step, a part having an elliptical outline as a face image; an identity judgment step of judging whether a face image newly detected in the face image detection step is of a same person as a face image detected last time or not based on positions of each face image; a storage image choice step of, when a newly detected face image has been judged to be of a same person in the identity judgment step, choosing one from a face image of the same person stored in a recording medium and the newly detected face image; and an image storage step of, when a newly detected face image has been chosen in the storage image choice step, storing in the recording medium both the newly detected face image and information for searching for the face image together.

There are other aspects of the invention as described below. This disclosure of the invention therefore intends to provide part of aspects of the invention and does not intend to limit the scope of the claimed invention.

BEST MODE OF EMBODYING THE INVENTION

Figure 1:
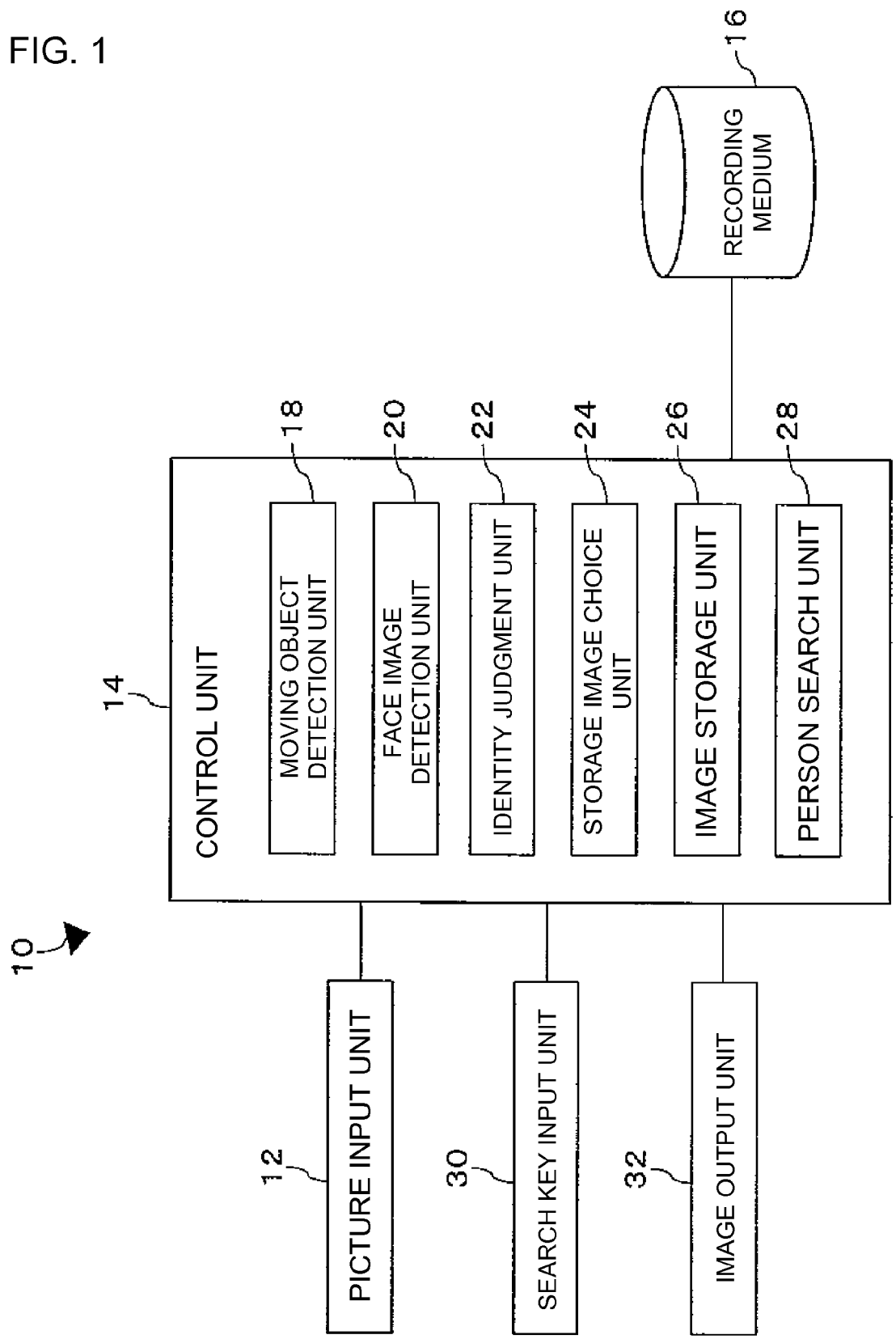
FIG. 1 is a block diagram illustrating a surveillance recorder of a first embodiment.

Now, the invention will be described in detail. However, the following detailed description and appended drawings are not intended to limit the invention. Rather, the scope of the invention is defined by the appended claims.

A surveillance recorder of this embodiment comprises: a picture input unit for inputting a surveillance picture; a moving object detection unit for detecting a moving object from a surveillance picture inputted by the picture input unit; a face image detection unit for detecting, from an object detected by the moving object detection unit, a part having an elliptical outline as a face image; an identity judgment unit for judging whether a face image newly detected by the face image detection unit is of a same person as a face image detected last time or not based on positions of each face image; a storage image choice unit for choosing a face image to be stored from a plurality of face images that have been judged to be of a same person by the identity judgment unit; and an image storage unit for storing in a recording medium both a face image chosen by the storage image choice unit and information for searching for the face image together.

In this configuration, a part having an elliptical outline is detected as a face image, and therefore a face image can be appropriately detected irrespective of the direction in which a surveillance image was taken. When face images detected one after another from a surveillance picture are of the same person, a face image most appropriate as a surveillance image, that is, a so-called "best-shot" face image, can be chosen from the detected face images and be stored. Storing both a chosen face image and information for searching for the face image together allows a face image of a targeted person to be searched for using the information for searching for the face image. This information for searching for a face image is, for example, a locus of movement of a person, a time at which a person appeared in a surveillance picture, and a time at which a person disappeared from a surveillance picture. The information can be extracted from information detected by the moving object detection unit and the face image detection unit.

A surveillance recorder of another aspect of the embodiment comprises: a picture input unit for inputting a surveillance picture; a moving object detection unit for detecting a moving object from a surveillance picture inputted by the picture input unit; a face image detection unit for detecting, from an object detected by the moving object detection unit, a part having an elliptical outline as a face image; an identity judgment unit for judging whether a face image newly detected by the face image detection unit is of a same person as a face image detected last time or not based on positions of each face image; a storage image choice unit for, when a newly detected face image has been judged to be of a same person by the identity judgment unit, choosing one from a face image of the same person stored in a recording medium and the newly detected face image; and an image storage unit for, when a newly detected face image has been chosen by the storage image choice unit, storing in the recording medium both the newly detected face image and information for searching for the face image together.

In this configuration, a part having an elliptical outline is detected as a face image, and therefore a face image can be appropriately detected irrespective of the direction in which a surveillance image was taken. When a face image newly detected from a surveillance picture is more appropriate as a surveillance image than a face image of the same person already stored in the recording medium, the face image in the recording medium is overwritten with the new face image, so a face image more appropriate as a surveillance image is recorded. By repeating this process, a face image most appropriate as a surveillance image, that is, a so-called "best-shot" face image, can be stored. Storing both a chosen face image and information for searching for the face image together allows a face image of a targeted person to be searched for using the information for searching for the face image.

In the above surveillance recorder, the image storage unit, when the identity judgment unit has judged that a face image newly detected by the face image detection unit is of a person different from a person whose face image was detected last time, may store in the recording medium the newly detected face image as a person who has newly appeared in a surveillance picture.

In this configuration, a face image of another person can be added to the recording medium.

In the above surveillance recorder, the identity judgment unit, if a distance between a position where a face image has been newly detected by the face image detection unit and a position where a face image was detected last time is less than a prescribed threshold, may judge that the newly detected face image is of a same person as the face image detected last time.

This configuration can accurately judge whether a newly detected face image is of the same person as a face image detected last time or not.

In the above surveillance recorder, the identity judgment unit, when a plurality of face images have been detected by the face image detection unit, may judge that a face image newly detected in a position nearest to a face image detected last time is of a same person as the face image detected last time.

In this configuration, a face image of the same person can also be appropriately chosen when a plurality of face images have been detected.

In the above surveillance recorder, the identity judgment unit, when there are a plurality of face images detected last time, may judge that a face image detected last time in a position nearest to a newly detected face image is of a same person as the newly detected face image.

In this configuration, a face image of the same person can also be appropriately chosen when there are a plurality of face images detected last time.

In the above surveillance recorder, the identity judgment unit may detect a direction of movement of face images detected one after another by the face image detection unit and, if having detected a change in a direction of movement, may judge that a face image is of another person.

This configuration can accurately detect a person who has appeared in a surveillance picture. For example, in a case where two persons get closer to each other and cross, a false detection that the two persons are the same can be avoided.

In the above surveillance recorder, the identity judgment unit, if a time taken from when a face image was detected by the face image detection unit to when a face image is newly detected has exceeded a prescribed threshold, may judge that the newly detected face image is of another person.

This configuration can accurately record a person who has appeared in a surveillance picture. For example, in a case where a person disappears from an edge of a surveillance picture and then a person newly appears in that neighborhood, a false detection that both persons are the same can be avoided.

In the above surveillance recorder, the storage image choice unit may choose, from a face image stored in the recording medium and a face image newly detected by the face image detection unit, a face image of a larger size.

In this configuration, a face image of a large size can be stored in the recording medium for the same person.

In the above surveillance recorder, the storage image choice unit may choose, from a face image stored in the recording medium and a face image newly detected by the face image detection unit, a face image whose average of distances from a center position to each pixel on an outline image of the face image is larger than the other's.

In this configuration, a face image of a large size can be stored in the recording medium for the same person.

In the above surveillance recorder, the storage image choice unit may choose, from a face image stored in the recording medium and a face image newly detected by the face image detection unit, a face image whose difference in average luminance between left and right is smaller than the other's.

In this configuration, a face image with high symmetry, that is, a face image closer to a front face, can be stored in the recording medium for the same person.

In the above surveillance recorder, the storage image choice unit may choose, from a face image stored in the recording medium and a face image newly detected by the face image detection unit, a face image more similar to a preset face outline template.

In this configuration, a face image close to a face outline template can be stored. If a face outline template whose face is located at the center is preset, a face image whose face is located at the center can be stored in the recording medium.

In the above surveillance recorder, the storage image choice unit may give scores for each of a plurality of judgment items to a face image stored in the recording medium and to a face image newly detected by the face image detection unit, and may choose a face image whose total score of the plurality of judgment items is higher than the other's.

In this configuration, a comprehensive judgment can be performed with the plurality of judgment items, and a face image most suitable for storage can be stored in the recording medium.

In the above surveillance recorder, the storage image choice unit may give scores for each of a plurality of judgment items to a face image newly detected by the face image detection unit and, if a total score of the plurality of judgment items has exceeded a prescribed threshold, may choose the detected face image.

In this configuration, a later detected face image among face images suitable for storage is stored in the recording medium. A person who appears in a surveillance picture taken by a surveillance camera is often approaching the camera, so the face image gradually becomes larger. For this reason, among face images having a score of the plurality of judgment items that exceeds the prescribed threshold, a later detected face image of a large size can be recorded.

A surveillance recording method of the embodiment comprises: a picture input step of inputting a surveillance picture; a moving object detection step of detecting a moving object from a surveillance picture inputted in the picture input step; a face image detection step of detecting, from an object detected in the moving object detection step, a part having an elliptical outline as a face image; an identity judgment step of judging whether a face image newly detected in the face image detection step is of a same person as a face image detected last time or not based on positions of each face image; a storage image choice step of choosing a face image to be stored from a plurality of face images that have been judged to be of a same person in the identity judgment step; and an image storage step of storing in a recording medium both a face image chosen in the storage image choice step and information for searching for the face image together.

In this configuration, as in the case of the surveillance recorder of the embodiment, a part having an elliptical outline is detected as a face image, and therefore a sideways-facing or backward-facing head can be appropriately detected and stored as a face image irrespective of the direction in which a surveillance image was taken. Additionally, the various configurations of the surveillance recorder of the embodiment can be applied to the surveillance recording method of the embodiment.

A surveillance recording method of the embodiment comprises: a picture input step of inputting a surveillance picture; a moving object detection step of detecting a moving object from a surveillance picture inputted in the picture input step; a face image detection step of detecting, from an object detected in the moving object detection step, a part having an elliptical outline as a face image; an identity judgment step of judging whether a face image newly detected in the face image detection step is of a same person as a face image detected last time or not based on positions of each face image; a storage image choice step of, when a newly detected face image has been judged to be of a same person in the identity judgment step, choosing one from a face image of the same person stored in a recording medium and the newly detected face image; and an image storage step of, when a newly detected face image has been chosen in the storage image choice step, storing in the recording medium both the newly detected face image and information for searching for the face image together.

In this configuration, as in the case of the surveillance recorder of the embodiment, a part having an elliptical outline is detected as a face image, and therefore a sideways-facing or backward-facing head can be appropriately detected and stored as a face image irrespective of the direction in which a surveillance image was taken. Additionally, the various configurations of the surveillance recorder of the embodiment can be applied to the surveillance recording method of the embodiment.

In the embodiment, a part having an elliptical outline is detected as a face image, and therefore a sideways-facing or backward-facing head can be appropriately detected and stored as a face image irrespective of the direction in which a surveillance image was taken. Additionally, when face images detected one after another from a surveillance picture are of the same person, a face image most appropriate as a surveillance image, that is, a so-called "best-shot" face image, can be chosen from the detected face images and be stored. The embodiment has these great advantages.

Now, the surveillance recorder of the embodiment of the invention will be described in further detail with reference to the drawings.

FIG. 1 shows a surveillance recorder 10 of the embodiment of the invention. In FIG. 1, the surveillance recorder 10 of the embodiment of the invention comprises a picture input unit 12 such as a camera for taking a surveillance picture, a control unit 14 for processing a surveillance picture inputted by the picture input unit 12, and a recording medium 16 for recording information extracted from a surveillance picture.

The control unit 14 has: a moving object detection unit 18 for detecting from a picture an area including a moving object (hereinafter referred to as "movement area") M and an outline of the moving object; a face image detection unit 20 for detecting a candidate for a face image F, using outline information derived from a movement area M detected by the moving object detection unit 18; an identity judgment unit 22 for judging whether successively-detected face images F are of the same person or of different persons, using positional information on a face outputted by the face image detection unit 20; a storage image choice unit 24 for, when the identity judgment unit 22 has judged that the face images are of the same person, choosing a face image F suitable for storage from the detected face images F and a face image F of the same person stored in the recording medium 16; an image storage unit 26 for storing in the recording medium 16 a face image F chosen by the storage image choice unit 24; and a person search unit 28 for searching the recording medium 16 for a face image F, using information related to the face image F as a search key. A search key input unit 30 accepts an input of a search key, and an image output unit 32 outputs a search result.

An operation of the surveillance recorder 10 configured as above will be described. First, a surveillance picture taken by the picture input unit 12 is inputted to the control unit 14. The moving object detection unit 18 of the control unit 14 detects, from the inputted surveillance image and a surveillance image inputted an infinitesimal time before, a movement area M and an outline T of a moving object. In concrete terms, the moving object detection unit 18 creates a difference image by means of an inter-frame difference which is a difference between corresponding pixels in a surveillance image inputted an infinitesimal time before and a currently inputted surveillance image. The embodiment adopts as a method of determining a difference image the method in which an inter-frame difference is calculated, but alternatively another method may create a difference image. For example, a background image may be stored in advance, and a difference image may be created by means of a background difference which is a difference between a current picture and the background image. A difference image may be created by combining an inter-frame difference and a background difference.

Figure 2:
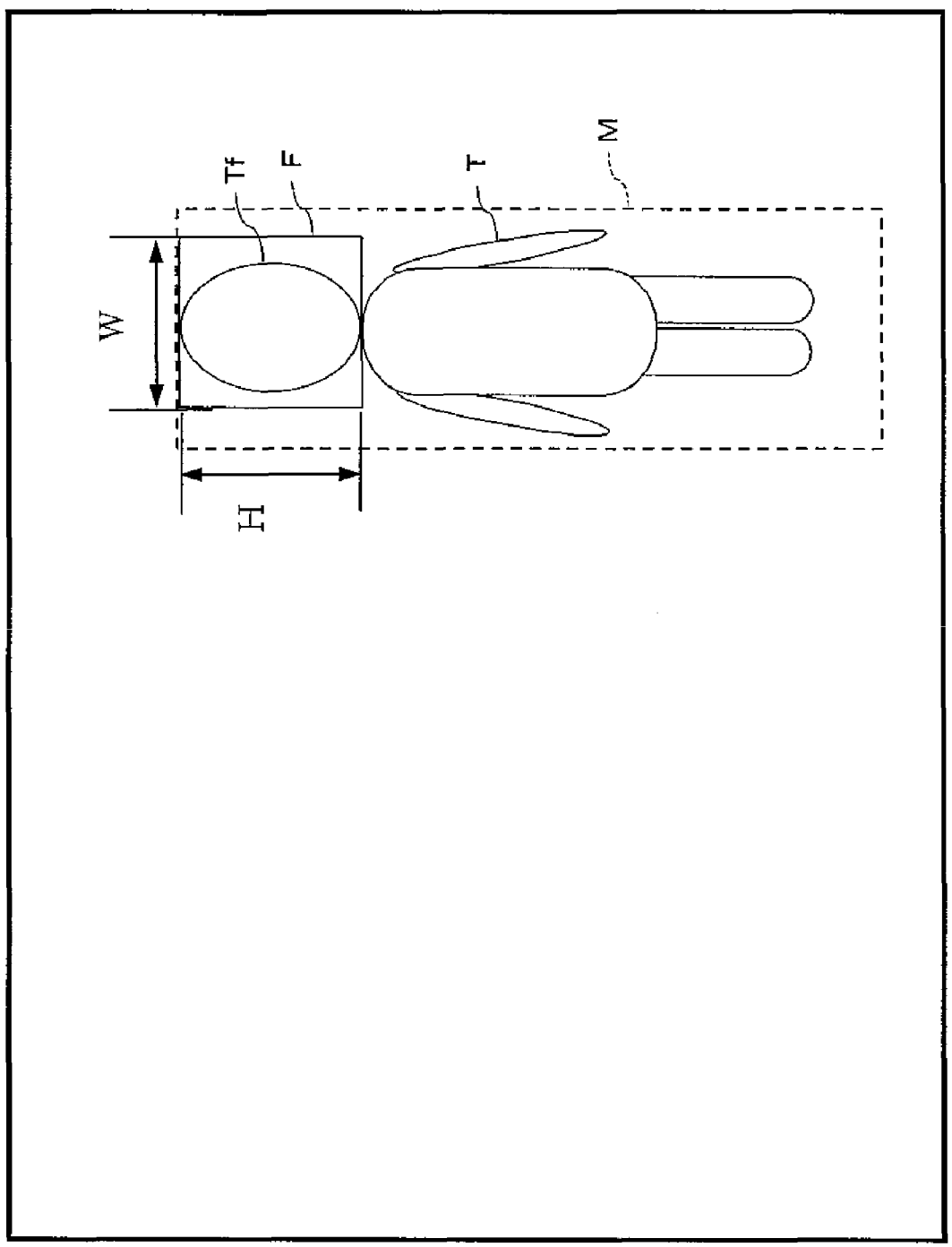
FIG. 2 illustrates an operation of detecting a face image from a surveillance picture.
Figure 3:
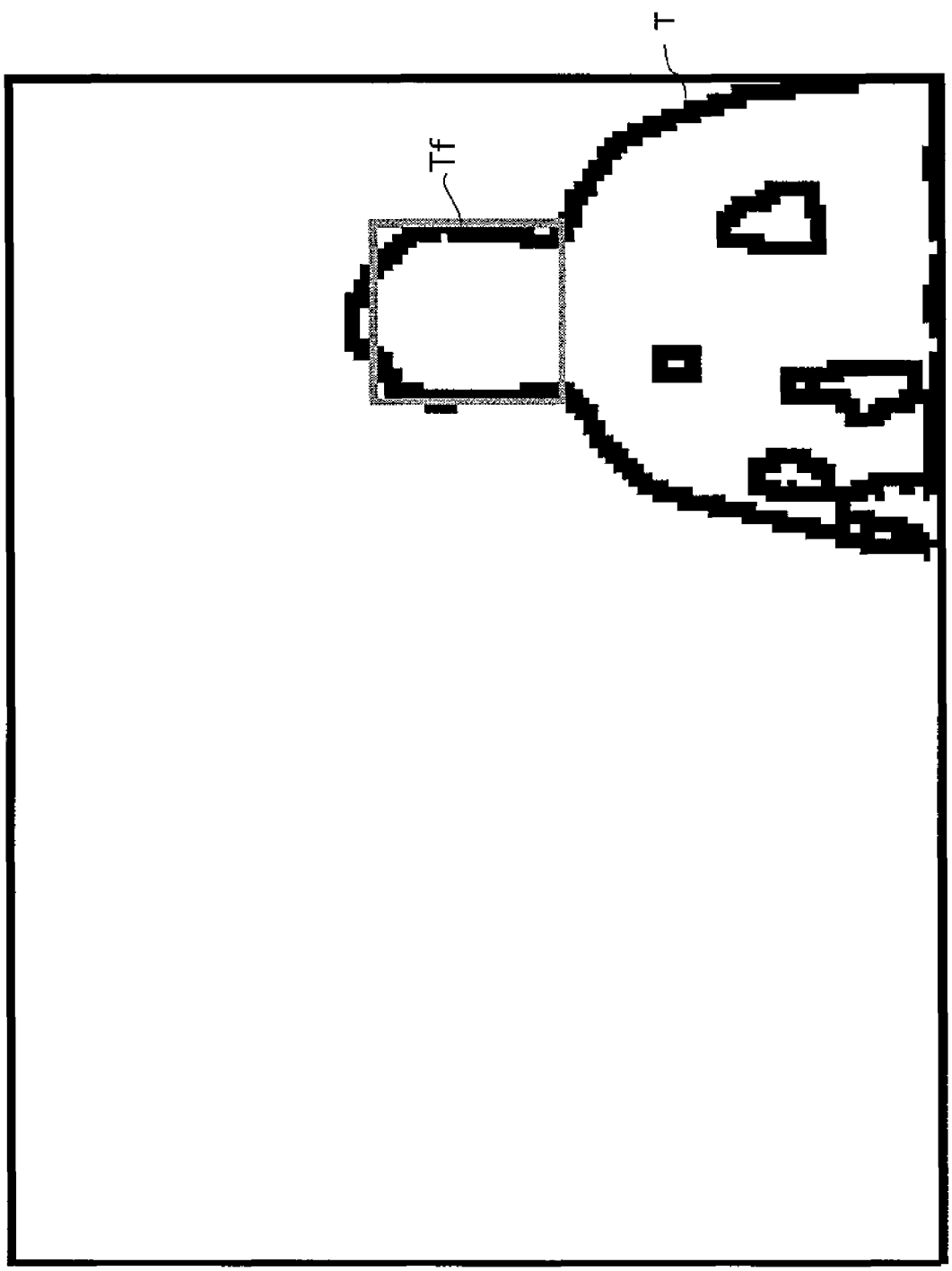
FIG. 3 illustrates an outline image.

FIG. 2 illustrates an operation of detecting a candidate for a face image F from a surveillance picture. The moving object detection unit 18 detects an existence region of a difference image by means of a technique such as labeling and calculation of histogram projected in vertical and horizontal directions, and detects a movement area M from the surveillance picture screen of FIG. 2. The moving object detection unit 18 performs thinning on the difference image, extracts an outline T of the moving object, and creates an outline image. In this way, an outline T of a moving object is detected as shown in FIG. 3.

The face image detection unit 20 then detects a face image F from the outline image created by the moving object detection unit 18. Since a face outline Tf is generally elliptically shaped, the face image F is detected by locating a position of an ellipse of a preset face size in the outline T, using an ellipse Hough detection method. As ellipses to be used for this purpose, the face image detection unit 20 has a plurality of ellipses having major and miner axes of different lengths. Having ellipses of a plurality of types allows individually-varied face images F to be detected accurately.

The identity judgment unit 22 then compares the detection position of the face image F detected by the face image detection unit 20 with a position of a face image F detected an infinitesimal time before, and judges whether the detected face image F and the face image F detected an infinitesimal time before are the face image F of the same person or of different persons. The judgment method of the identity judgment unit 22 will be described here with reference to FIGS. 4 to 7.

Figure 4:
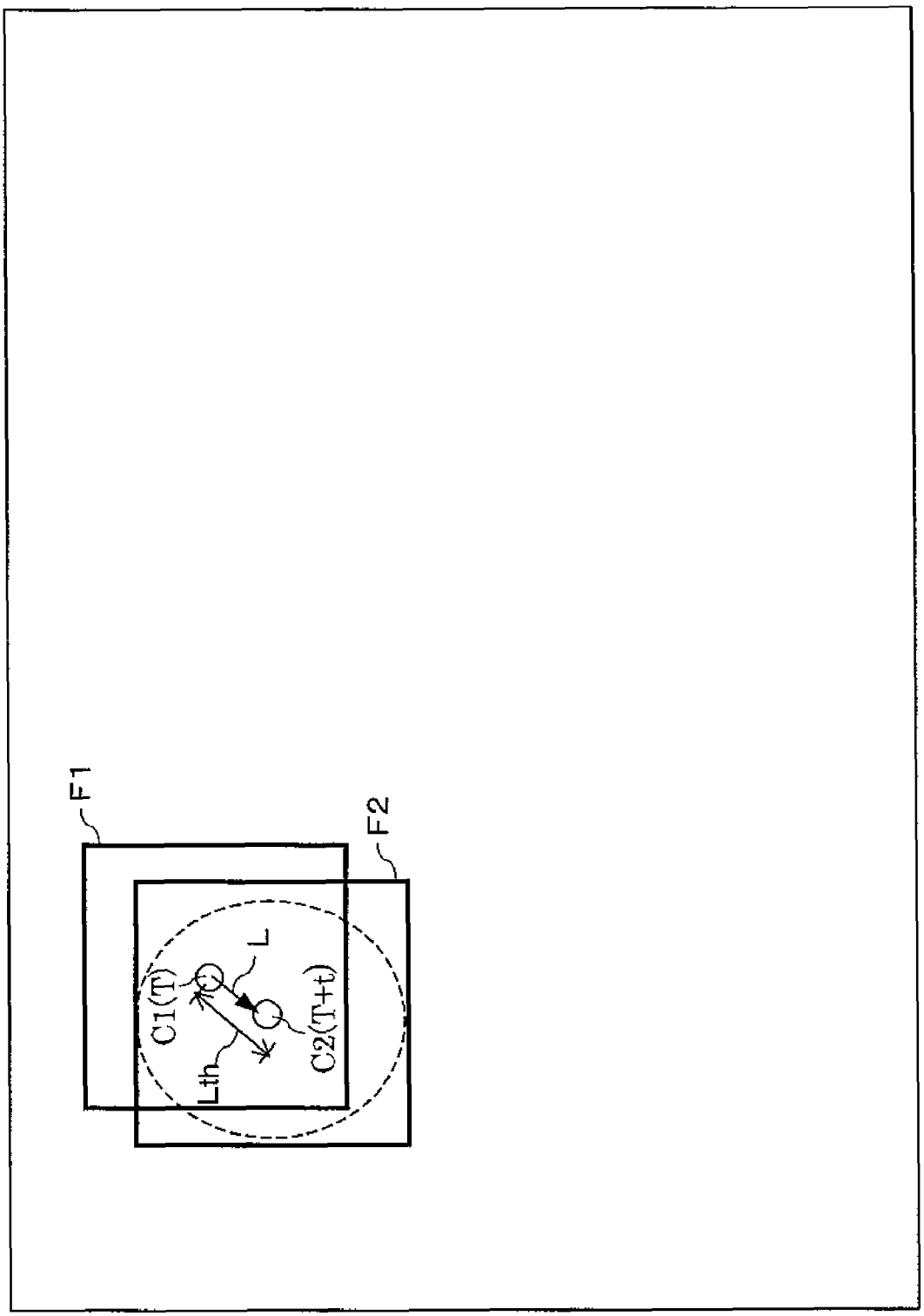
FIG. 4 illustrates an identity judgment method for when the number of detected face images is one.
Figure 5:
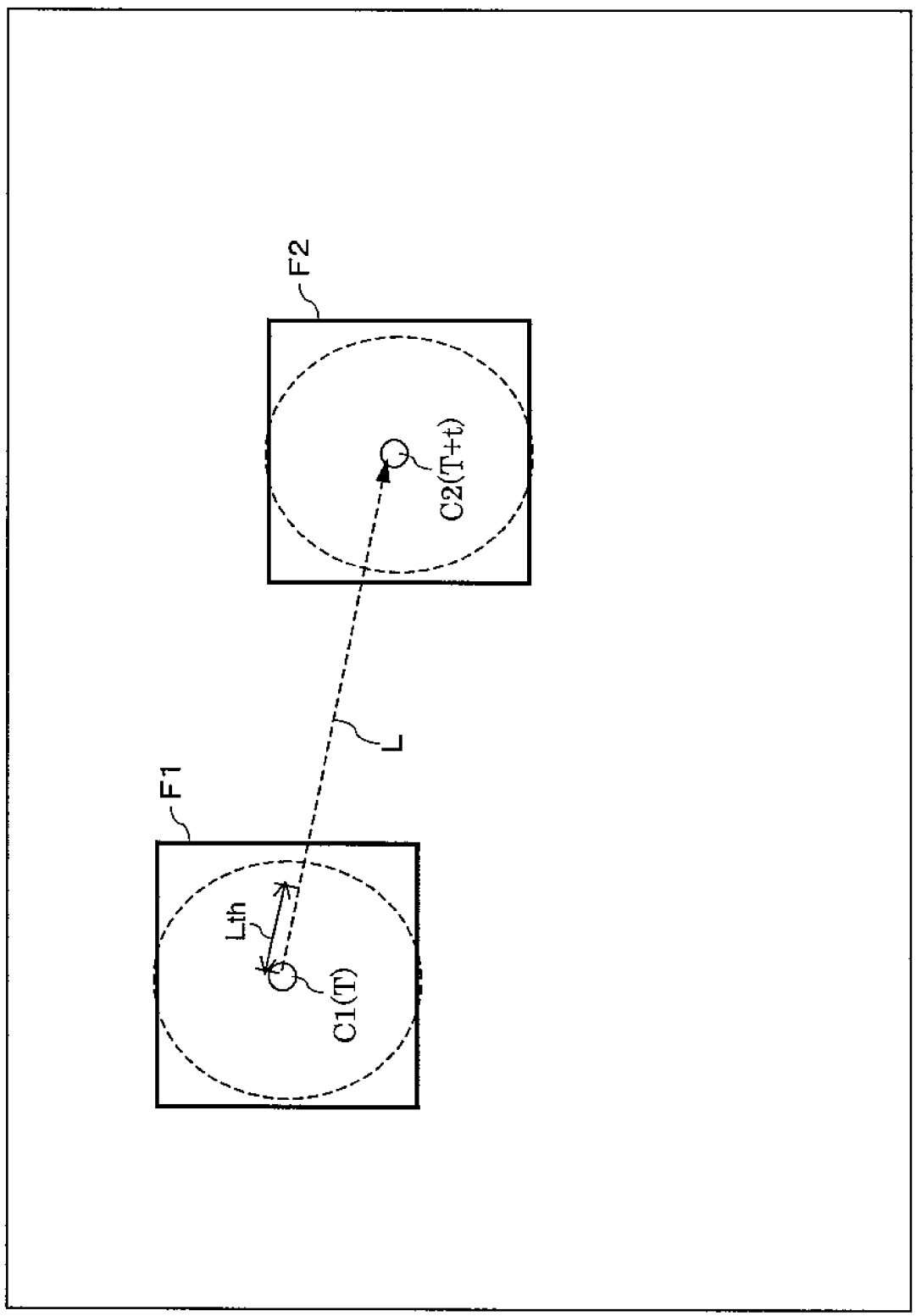
FIG. 5 illustrates the identity judgment method for when the number of detected face images is one.

FIGS. 4 and 5 illustrate an identity judgment method for when the number of detected face images is one. The identity judgment unit 22 calculates the distance L between a center position C1 (T) of a face image F1 at time T and a center position C2(T+t) of a face image F2 at time T+t an infinitesimal time after T. When the distance L is less than a prescribed threshold Lth, the identity judgment unit 22 judges that the face images F1 and F2 are of the same person. As shown in FIG. 5, when the distance L is larger than the threshold Lth, the identity judgment unit 22 judges that the face images F1 and F2 are of different persons. If the time interval between time T and time T+t is longer than a prescribed time, the identity judgment unit 22 judges that the face images are of different persons, even when the distance L is less than the threshold Lth.

Figure 6:
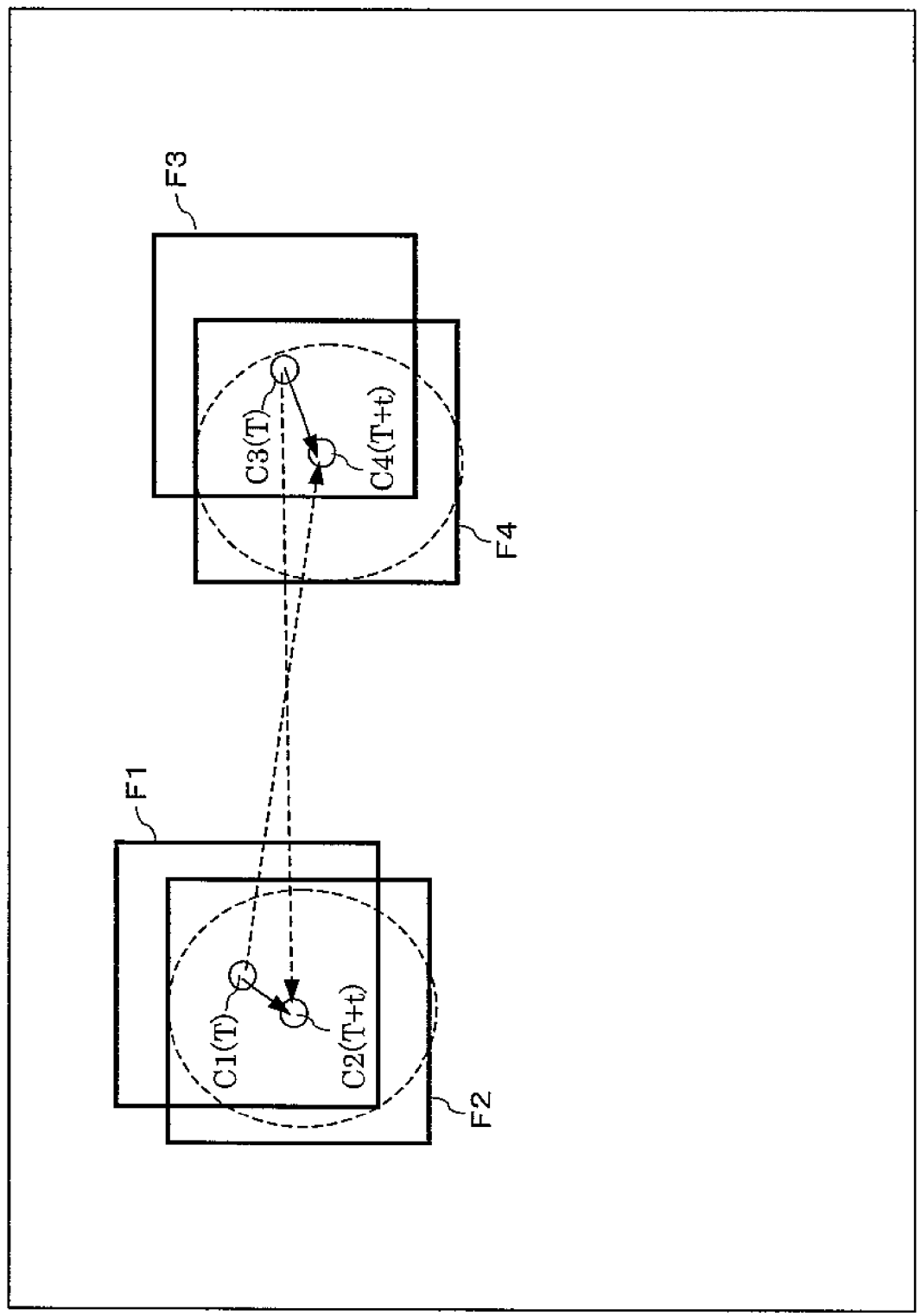
FIG. 6 illustrates an identity judgment method for when the number of detected face images is more than one.
Figure 7:
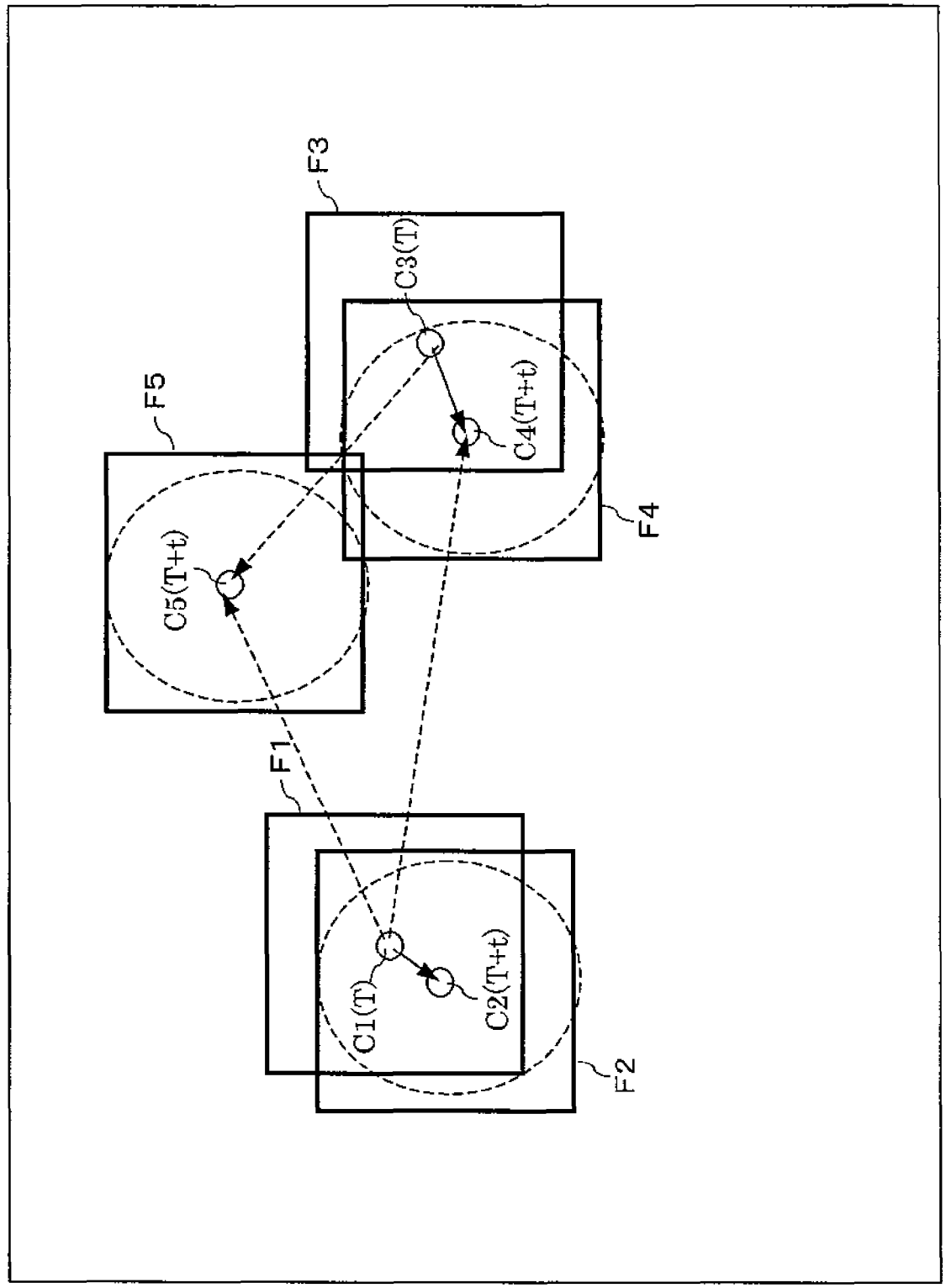
FIG. 7 illustrates the identity judgment method for when the number of detected face images is more than one.

FIGS. 6 and 7 illustrate an identity judgment on a plurality of face images. When a plurality of face images are detected, the identity judgment unit 22 calculates the distances between a center position of a face image detected at time T and center positions of all face images at time T+t, detects a combination whose distance is the least, and judges that they are of the same person if the distance is less than a threshold. The identity judgment unit 22 performs this judgment on all center positions for time T and judges the plurality of face images. For example, in an example shown in FIG. 6, face images F1 and F3 are detected at time T, and face images F2 and F4 are detected at time T+t. In this case, the identity judgment unit 22 separately determines the distances between a center position C1 (T) of the face image F1 and a center position C2(T+t) of the face image F2, and between the center position C1 (T) of the face image F1 and a center position C4(T+t) of the face image F4. As a result, the distance between the combination of the center position C1(T) and the center position C2(T+t) is less, and therefore the identity judgment unit 22 judges that the face images F1 and F2 are of the same person. In the same way, the identity judgment unit 22 separately determines the distances between a center position C3(T) of the face image F3 and the center position C2(T+t) of the face image F2, and between the center position C3(T) of the face image F3 and the center position C4(T+t) of the face image F4. As a result, the distance between the combination of the center position C3(T) and the center position C4(T+t) is less, and therefore the identity judgment unit 22 judges that the face images F3 and F4 are of the same person.

FIG. 7 shows an example where a face image F5 is detected at time T+t in addition to the detection result of face images F1 to F4 shown in FIG. 6. The face image F5 of this example does not correspond to any of the face images F1 and F3 at time T, and such a face image is judged by the identity judgment unit 22 to be of a new person different from the face images detected at time T.

The storage image choice unit 24 then compares a face image F stored in the recording medium 16 with the currently detected face image F, and chooses an image suitable for storage based on conditions such as the size and face direction of the face image F. In concrete terms, if the identity judgment unit 22 has judged that a currently detected image is the face image F of the same person as an image detected an infinitesimal time before, the storage image choice unit 24 reads the face image F of the person from the recording medium 16. The storage image choice unit 24 compares a plurality of judgment items described below between the face image F read from the recording medium 16 and the detected face image F. The storage image choice unit 24 gives scores for each of the plurality of judgment items, and judges which of the face image F read from the recording medium 16 or the currently detected face image F is suitable for storage, by a total score that is the total for scores of each judgment item. Alternatively, scores of each judgment item for the stored face image F may be stored in the recording medium 16, and the storage image choice unit 24 may read the stored scores from the recording medium 16 to compare them with scores of the detected face image F. Now, each of the plurality of judgment items will be described with reference to FIGS. 2 and 8 to 10.

A first judgment item is the size of a face image F. The storage image choice unit 24 judges the size of a face by the width W and height H of a face image F shown in FIG. 2. In accordance with the width and height of an ellipse Hough detection area of a face image F stored in the recording medium 16 and with the width and height of an ellipse Hough detection area of a detected face image F, the storage image choice unit 24 gives scores P1 to each of the stored face image F and the detected face image F. As for the score P1, a higher score is given as the width W and height H become larger.

Figure 8:
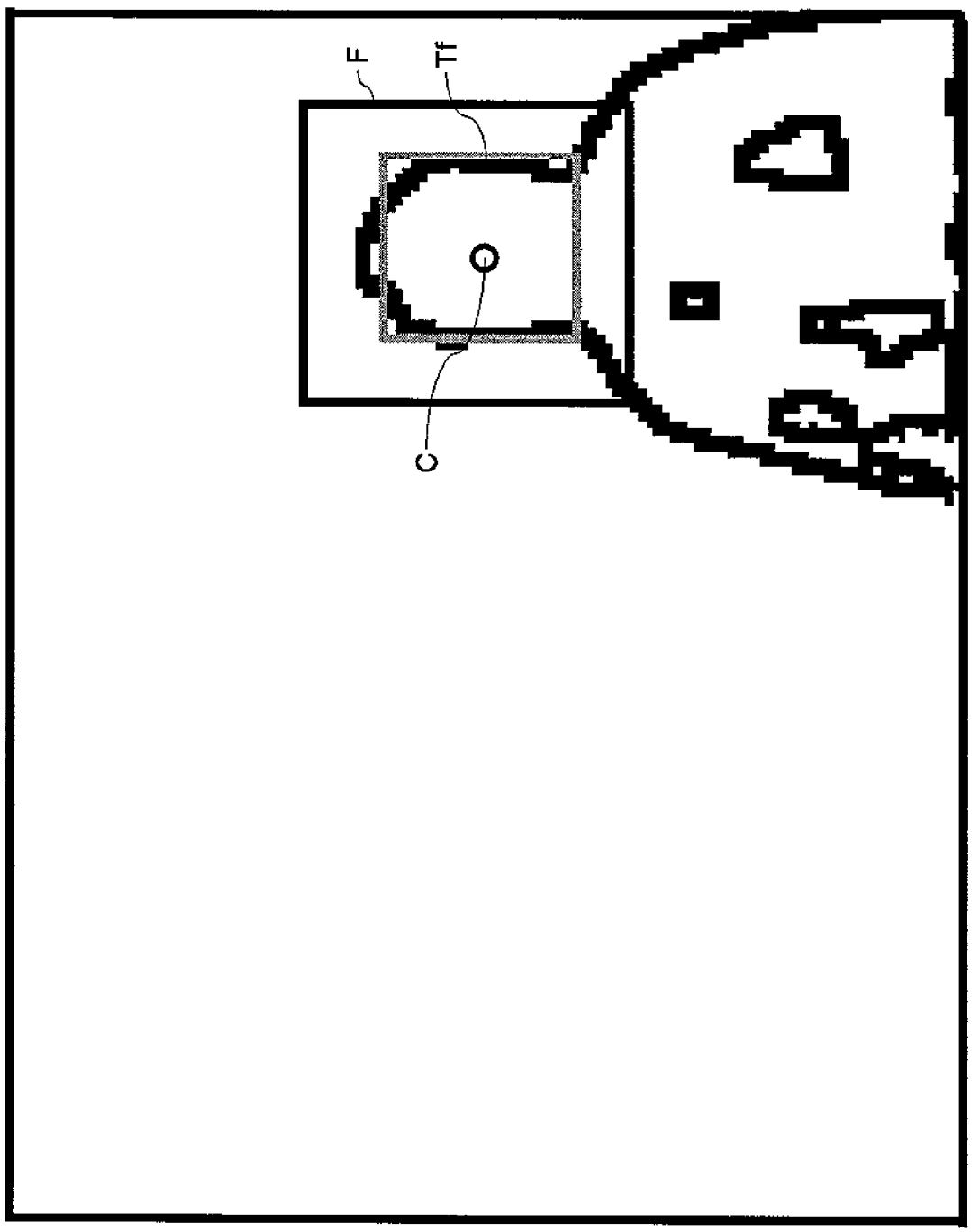
FIG. 8 illustrates a method of calculating an average distance from a center position of a face image to pixels on an outline.

A second judgment item is the size of a face outline Tf in a face image F. FIG. 8 is an outline image detected by the moving object detection unit 18. A method of calculating the size of a face outline Tf will be described with reference to FIG. 8. The storage image choice unit 24 calculates the distances between each pixel forming the face outline Tf and a center position C of the face image F, and calculates the average of them. The face size is proportional to this average. In accordance with the average distance of a face image F stored in the recording medium 16 and with the average distance of outline pixels of a detected face image F, the storage image choice unit 24 gives scores P2 to each of the stored face image F and the detected face image F. As for the score P2, a higher score is given as the average distance D become larger.

Figure 9:
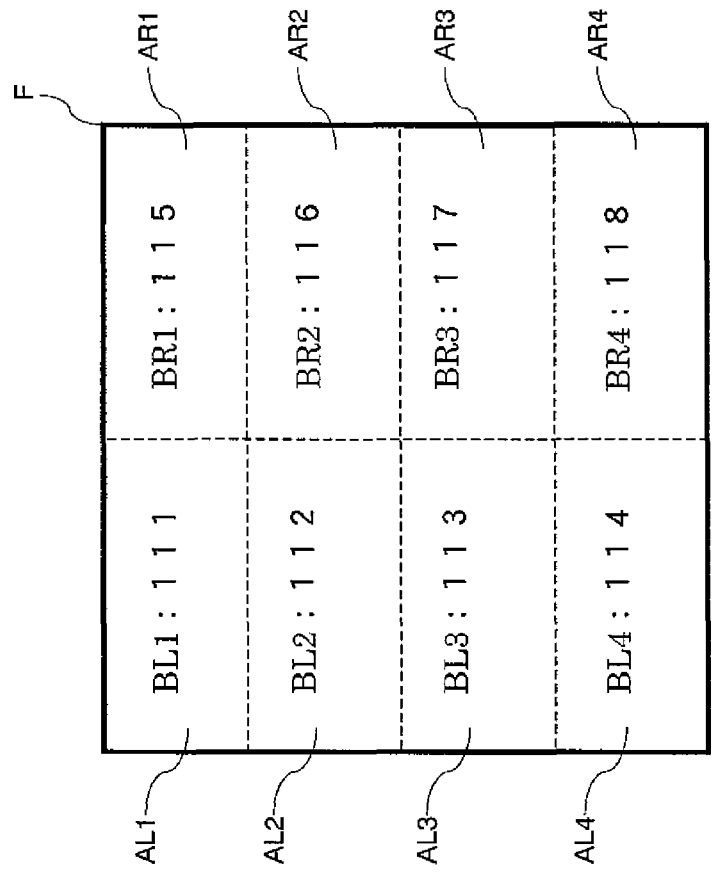
FIG. 9 illustrates a method of calculating a cumulative value of the difference in luminance between the left and right of a face image.

A third judgment item is a face direction in a face image F. FIG. 9 illustrates a method of determining left-right symmetry in luminance in order to detect a face direction. The difference in luminance between left and right of a front face is small because a front face is highly symmetric. As a front face turns sideways, the left-right symmetry is destroyed and the difference in luminance between left and right becomes large. A face direction is judged using this tendency. As shown in FIG. 9, the storage image choice unit 24 divides a face image F into left and right sides, further divides the divided areas into equal areas of ALi and ARi, and calculates luminance averages BLi and BRi for them (i=1 to 4). The storage image choice unit 24 then calculates a left-right luminance difference cumulative value Bs using the following:

$$Bs = \Sigma |BLi - BRi|$$

In accordance with the left-right luminance difference cumulative value stored in the recording medium 16 and with the left-right luminance difference cumulative value of the currently detected face image F, the storage image choice unit 24 gives scores P3 to each of the stored face image F and the detected face image F. As for the score P3, a higher score is given as the luminance difference cumulative value Bs becomes smaller.

Figure 10A:
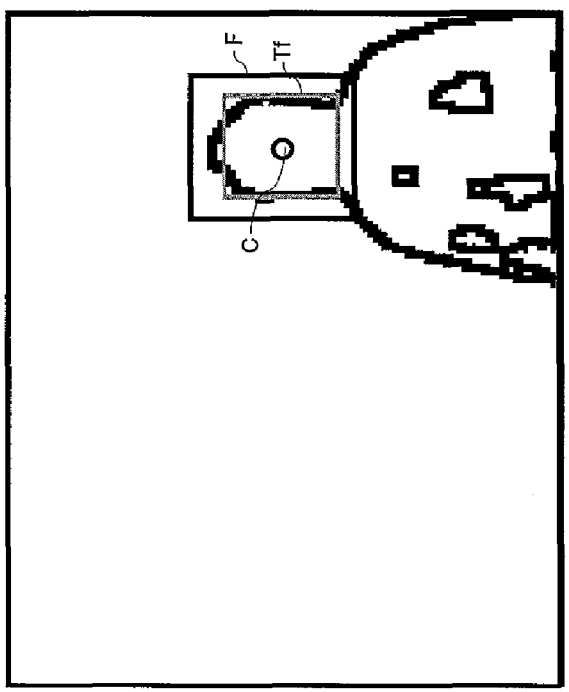
FIG. 10A shows an example of an outline image detected by a moving object detection unit.
Figure 10B:
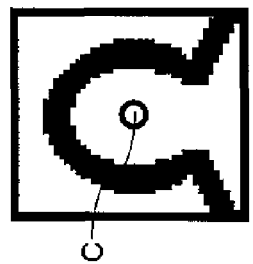
FIG. 10B shows an example of a face outline template for forward-facing use.
Figure 10C:
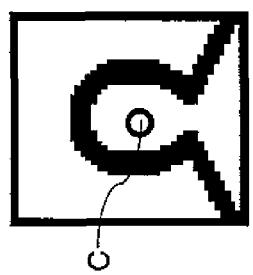
FIG. 10C shows an example of a face outline template for backward-facing use.

A fourth judgment item is a position of a face in a face image F. FIGS. 10A to 10C illustrates a process to detect whether a face is appropriately located in a face image F or not. FIG. 10A is an outline image detected by the moving object detection unit 18, and FIGS. 10B and 10C are face outline templates. A face outline template is an average outline of a head and shoulders. FIG. 10B is a face outline template for forward-facing use, and FIG. 10C is a face outline template for backward-facing use. Different face outline templates are set in order to detect a front face of a large size for forward facing, and to detect a head of a little small size for backward facing because it would be difficult to determine characteristics of a person if a head is clipped large.

The storage image choice unit 24 detects whether a face image F is forward-facing or backward-facing, superimposes a corresponding face outline template on the face image F at their center positions C, and calculates for all outline pixels in such a way that +1 is added if an outline pixel matches the template and −1 is added if an outline pixel does not match the template. In accordance with the matching similarity stored in the recording medium 16 and with the currently detected matching similarity with the face outline template, the storage image choice unit 24 gives scores P4 to each of the stored face image F and the detected face image F. As for the score P4, a higher score is given as the matching similarity becomes larger.

A best-shot judgment to judge whether to update a next previously detected face image F with a currently detected face image F or not is determined by the scores P1 to P4 of each of the above judgment items. The storage image choice unit 24 determines a total score by summing up the above scores P1 to P4, and chooses a face image whose total score is higher than the other's. A plurality of judgment items can thus be comprehensively judged, and a face image F most suitable for storage can be stored in the recording medium 16.

The image storage unit 26 shown in FIG. 1 then stores in the recording medium 16 a face image F chosen by the storage image choice unit 24. The storage image choice unit 24 chooses a face image F suitable for storage from a detected face image F and a storage image stored in the recording medium 16. Repeatedly overwriting and storing a chosen face image F in the recording medium 16 eventually allows a face image F most suitable for storage to be stored in the recording medium 16. The image storage unit 26 stores both a chosen face image F and information detected at any time by the moving object detection unit 18 and the face image detection unit 20, such as positional information on a movement area M, positional information on the face image F, times at which the person appeared in and disappeared from a surveillance picture screen, and a direction of movement of the person, together in the recording medium 16.

After a recording, the person search unit 28 searches for a person who appeared in a surveillance picture, using various information stored by the image storage unit 26. For example, since the storage image choice unit 24 records an image suitable for storage for the same person, displaying a list of best-shot face images allows a person to be easily and quickly searched for. A search by time, a search by a direction of movement, or other search by narrowed down conditions can be performed.

The surveillance recorder 10 of the embodiment locates a position of an ellipse of a preset face size and detects a part having an elliptical outline as a face image F, and therefore a face image F can be appropriately detected irrespective of the direction in which a surveillance image was taken.

When face images F detected one after another from a surveillance picture are of the same person, the surveillance recorder 10 of the embodiment can choose from the detected face images F and stores a face image F most appropriate as a surveillance image, that is, a so-called "best-shot" face image F. In addition to a front face, a shot taken from above which is common with surveillance images and a sideways-facing and backward-facing head can be recorded as history information from a surveillance image, so that security of a surveillance system improves.

The surveillance recorder 10 of the embodiment can quickly search a surveillance picture recorded for a long time for a targeted scene where there is a person.

While the surveillance recorder 10 of the invention has been described in detail with reference to embodiments thereof, the invention is not limited to the embodiments described above.

In the above-described embodiments, an identity judgment is performed based on positions of a face image F detected an infinitesimal time before and of a currently detected face image F. Alternatively, the identity judgment unit 22 may perform an identity judgment also in consideration of a history of movement of a face image F.

Figure 11:
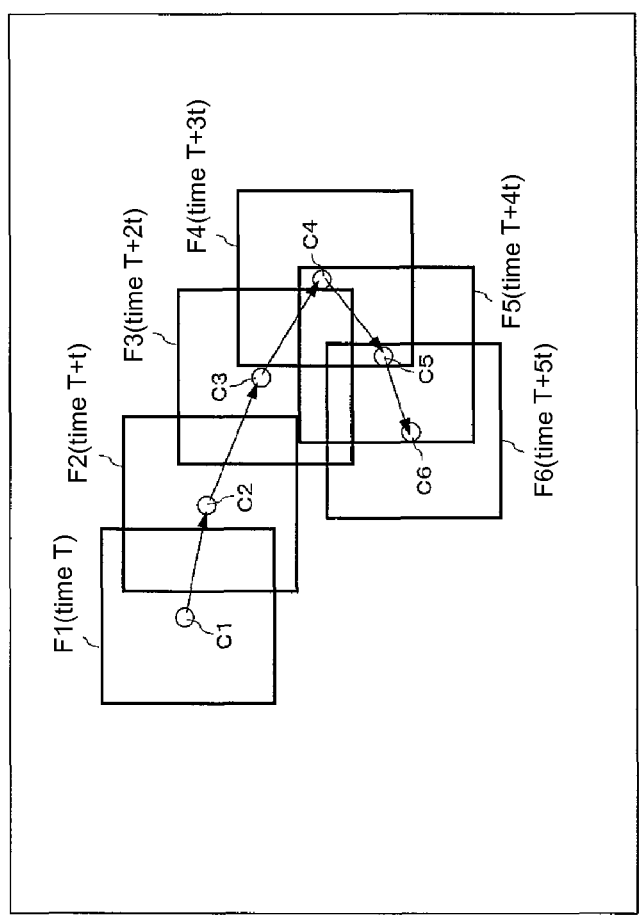
FIG. 11 illustrates an identity judgment method for when a change has been detected in a direction of movement.

FIG. 11 illustrates a method of identity judgment by the identity judgment unit 22. In a case where face images F1 to F6 have been detected which move along a path shown in FIG. 11, there are a possibility that the same person changed the direction at time T+3t, and a possibility that another person crossed who was moving from right to left of the screen. If an identity judgment is performed by using only the distances between center positions, another person who is crossing would be judged to be the same person, and detection of a previously detected person might be hampered. To solve this problem, as shown in FIG. 11, a judgment by distance described in the above embodiment is performed from time T to time T+3t during which there is no change in the direction of movement in the sideways direction, and it is judged that there is another person at time T+4t when a change in the direction of movement is detected, irrespective of the judgment by distance of the above embodiment. That is, it is judged that there is another person even when the distance between a center position C4 of a face image F4 at time T+3t and a center position C5 of a face image F5 at time T+4t is less than a threshold.

In the above-described embodiments, the storage image choice unit 24 compares a face image F stored in the recording medium 16 with a currently detected face image F, and chooses, as a storage image, one whose total score of a plurality of judgment items is higher than the other's. Alternatively, a storage image may be chosen by another criterion. For example, a face image F may be judged to be best-shot if the total score is a prescribed threshold or more, and then a face image F stored in the recording medium 16 until just before may be updated with the new best-shot face image F.

While the storage image choice unit 24 chooses a face image F to be stored by a plurality of judgment items in the above-described embodiments, there is no need to use all the above judgment items. In the invention, a storage image may be chosen using any of the above judgment items, or a judgment may be performed by a judgment item other than the above.

While there has been described what are at present considered to be preferred embodiments of the invention, it will be understood that various modifications and variations may be made thereto, and it is intended that appended claims cover all such modifications and variations as fall within the true spirit and scope of the invention.

Industrial Applicability

As described above, in the invention, since a part having an elliptical outline is detected as a face image, even a sideways-facing or backward-facing head can be appropriately detected as a face image and be stored, irrespective of the direction in which a surveillance image was taken. The invention has these great advantages and is useful as a surveillance recorder for monitoring a human motion with a camera, or the like.

The invention claimed is:

1. A surveillance recorder comprising:
a picture input unit for inputting a surveillance picture;
a moving object detection unit for detecting a moving object from a surveillance picture inputted by the picture input unit;
a face image detection unit for detecting, from the object detected by the moving object detection unit, a part having an elliptical outline as a face image;
an identity judgment unit for judging whether the face image newly detected by the face image detection unit is the same person as a face image detected last time or not based on positions of each face image;
a storage image choice unit for, when a newly detected face image has been judged to be of the same person by the identity judgment unit, choosing another face image from face image(s) of the same person stored in a recording medium and the newly detected face image; and
an image storage unit for, when the newly detected face image has been chosen by the storage image choice unit, storing in the recording medium both the newly detected face image and information for searching for the newly detected face image together, wherein
the identity judgment unit detects a direction of movement of face images detected one after another by the face image detection unit and, if having detected a change in a direction of movement, judges that the face image is of another person.

2. The surveillance recorder according to claim 1, wherein the image storage unit, when the identity judgment unit has judged that the face image newly detected by the face image detection unit is of a person different from the person whose face image was detected last time, stores in the recording medium the newly detected face image as a person who has newly appeared in the surveillance picture.

3. The surveillance recorder according to claim 1, wherein the identity judgment unit, if a distance between a position where the face image has been newly detected by the face image detection unit and a position where the face image was detected last time is less than a prescribed threshold, judges that the newly detected face image is of the same person as the face image detected last time.

4. The surveillance recorder according to claim 1, wherein the identity judgment unit, when a plurality of face images have been detected by the face image detection unit, judges that a face image newly detected in a position nearest to the face image detected last time is of the same person as the face image detected last time.

5. The surveillance recorder according to claim 1, wherein the identity judgment unit, when there are a plurality of face images detected last time, judges that the face image detected last time in a position nearest to a newly detected face image is of the same person as the newly detected face image.

6. The surveillance recorder according to claim 1, wherein the identity judgment unit, if a time taken from when the another face image was detected by the face image detection unit to when the face image is newly detected has exceeded a prescribed threshold, judges that the newly detected face image is of another person.

7. The surveillance recorder according to claim 1, wherein the storage image choice unit chooses, from the another face image stored in the recording medium and the face image newly detected by the face image detection unit, the face image that is larger in size.

8. The surveillance recorder according to claim 1, wherein the storage image choice unit chooses, from the another face image stored in the recording medium and the face image newly detected by the face image detection unit, the face image whose average of distances from a center position to each pixel on an outline image of the face image is larger than the other.

9. The surveillance recorder according to claim 1, wherein the storage image choice unit chooses, from the another face image stored in the recording medium and the face image newly detected by the face image detection unit, the face image whose difference in average luminance between left and right is smaller than the other.

10. The surveillance recorder according to claim 1, wherein the storage image choice unit chooses, from the another face image stored in the recording medium and the face image newly detected by the face image detection unit, the face image more similar to a preset face outline template.

11. The surveillance recorder according to claim 1, wherein the storage image choice unit gives scores for each of a plurality of judgment items to the another face image stored in the recording medium and to the face image newly detected by the face image detection unit, and chooses the face image whose total score of the plurality of judgment items is higher than the other's.

12. The surveillance recorder according to claim 1, wherein the storage image choice unit gives scores for each of a plurality of judgment items to the face image newly detected by the face image detection unit and, if a total score of the plurality of judgment items has exceeded a prescribed threshold, chooses the detected face image.

13. A surveillance recording method comprising:
a picture input step of using a picture input unit for inputting a surveillance picture into a computerized control unit;
a moving object detection step of using the control unit for detecting a moving object from the surveillance picture inputted in the picture input step;
a face image detection step of using the control unit for detecting, from the object detected in the moving object detection step, a part having an elliptical outline as a face image;
an identity judgment step of using the control unit for judging whether the face image newly detected in the face image detection step is of the same person as another face image detected last time or not based on positions of each face image;
a storage image choice step of using the control unit for choosing a face image to be stored from a plurality of face images that have been judged to be of the same person in the identity judgment step; and
an image storage step of storing in a recording medium both the face image chosen in the storage image choice step and information for searching for the newly detected face image together, wherein
the identity judgment step includes detecting a direction of movement of face images detected one after another and, if having detected a change in a direction of movement, judges that the face image is of another person.

14. A surveillance recording method comprising:

a picture input step of using a picture input unit for inputting a surveillance picture into a computerized control unit;

a moving object detection step of using the control unit for detecting a moving object from the surveillance picture inputted in the picture input step;

a face image detection step of using the control unit for detecting, from the object detected in the moving object detection step, a part having an elliptical outline as a face image;

an identity judgment step of using the control unit for judging whether the face image newly detected in the face image detection step is of the same person as another face image detected last time or not based on positions of each face image;

a storage image choice step of using the control unit for, when the newly detected face image has been judged to be of the same person in the identity judgment step, choosing one from the another face image of the same person stored in a recording medium and the newly detected face image; and an image storage step of, when the newly detected face image has been chosen in the storage image choice step, storing in the recording medium both the newly detected face image and information for searching for the another face image together, wherein the identity judgment step includes detecting a direction of movement of face images detected one after another and, if having detected a change in a direction of movement, judges that the face image is of another person.

* * * * *